2 Sheets—Sheet 1.

D. W. SMITH.

SAFE.

No. 10,254. Reissued Dec. 5, 1882.

Witnesses:
John C. Kemon
Chas. A. Pettit

Inventor.
David W. Smith
By Munn & Co
Attorneys

N. PETERS, Photo-Lithographer, Washington, D. C.

2 Sheets—Sheet 2.
D. W. SMITH.
SAFE.
No. 10,254.
Reissued Dec. 5, 1882.
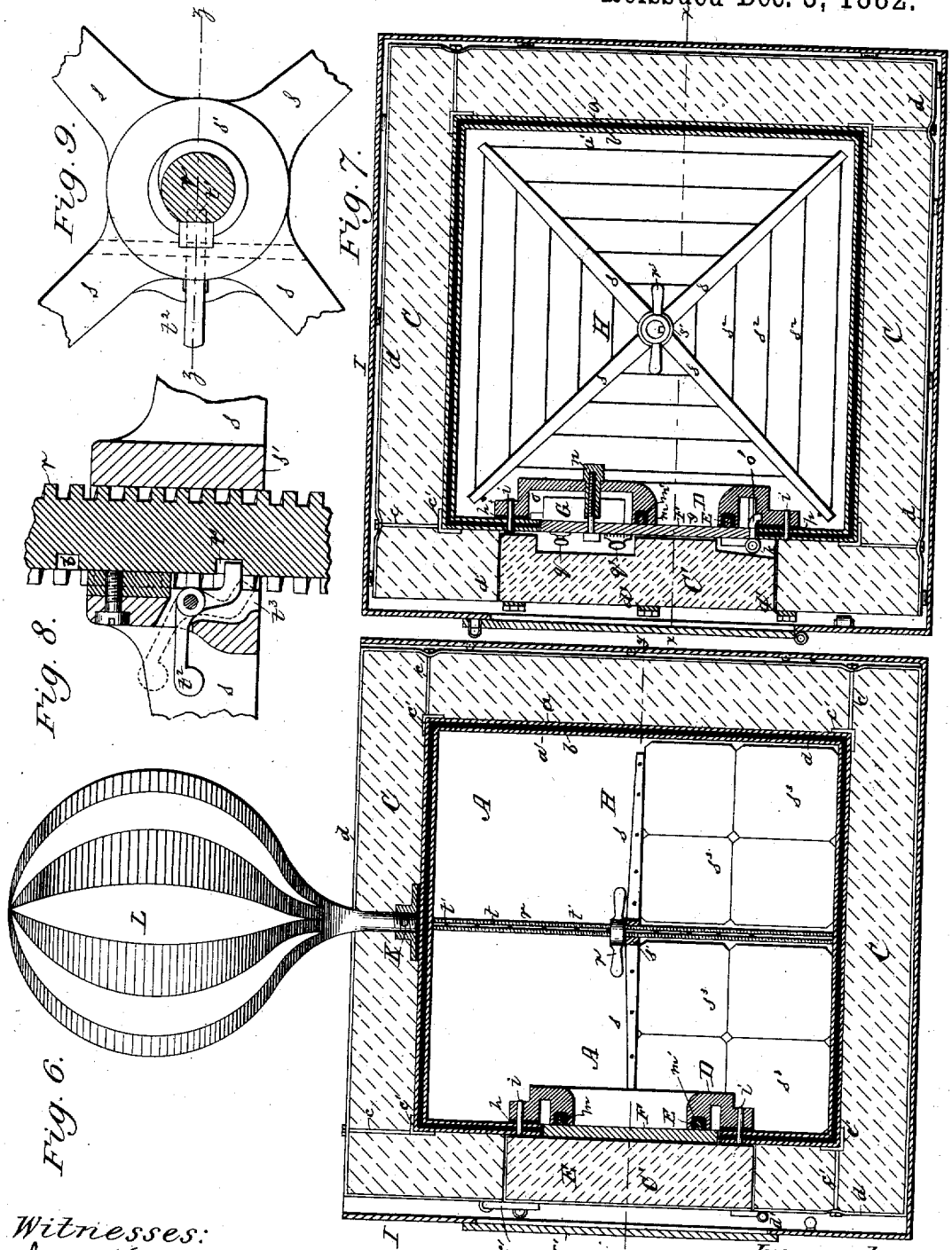
Witnesses:
Geo. E. Kenyon
Chas. A. Pettit
Inventor:
David W. Smith
By Munn & Co.
Attorneys.
N. PETERS, Photo-Lithographer, Washington, D. C.

UNITED STATES PATENT OFFICE.

DAVID W. SMITH, OF PORT TOWNSEND, WASHINGTON TERRITORY.

SAFE.

SPECIFICATION forming part of Letters Patent No. 10,254, dated December 5, 1882.

Original No. 257,094, dated April 25, 1882. Application for reissue filed October 26, 1882.

*To all whom it may concern:*

Be it known that I, DAVID W. SMITH, of Port Townsend, in the county of Jefferson and Territory of Washington, have invented a new and Improved Safe, of which the following is a specification.

The object of this invention is to prevent the loss of money at sea by providing a water-proof, burglar-proof, and partially or wholly fire-proof and buoyant safe for containing money and other valuables on shipboard.

Figure 1:
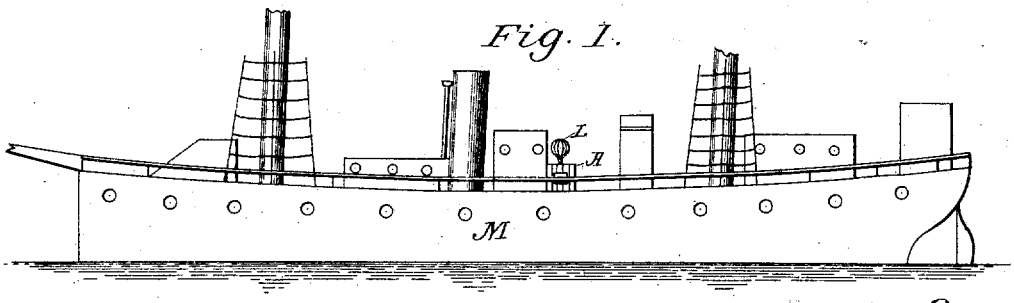
Figure 2:
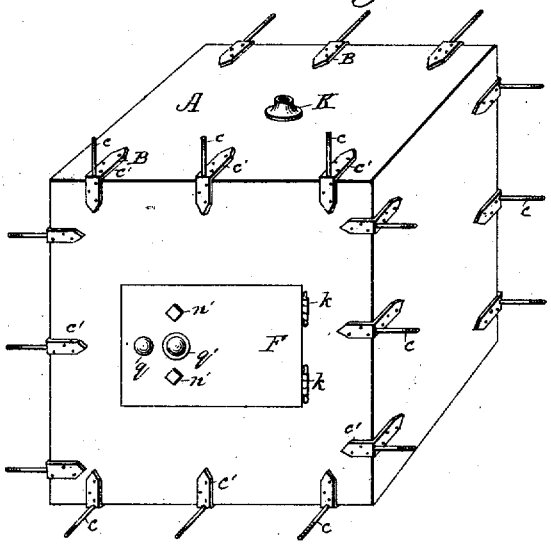
Figure 3:
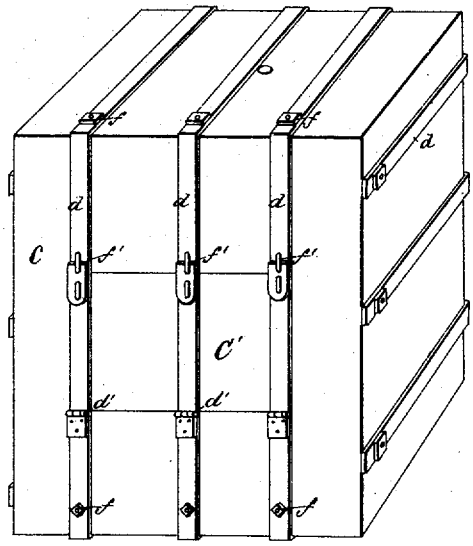
Figure 4:
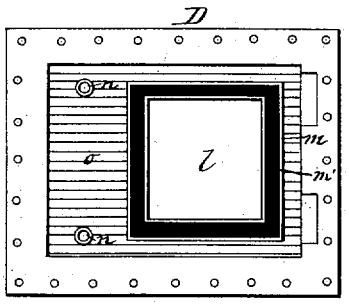
Figure 5:
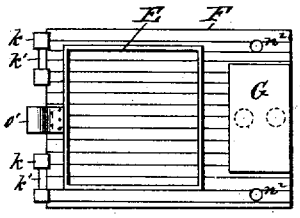

Figure 1 is a side elevation of a vessel, showing the safe in position. Fig. 2 is a perspective view of the safe with door and with attached fastenings for securing the buoyant shell or jacket. Fig. 3 is a perspective view of the safe jacketed. Fig. 4 is an enlarged front elevation of the safe-door plate. Fig. 5 is an enlarged elevation of the inside of the safe-door. Fig. 6 is an enlarged sectional elevation on line *x x*, Fig. 7, of the jacketed safe and fixed receptacle and attached buoy. Fig. 7 is an enlarged transverse section on line *y y*, Fig. 6. Fig. 8 is an enlarged sectional elevation of a portion of the device for holding the contents of the safe immovable, on line *z z*, Fig. 9. Fig. 9 is a plan of the same, partly in section.

Similar letters of reference indicate corresponding parts.

In the accompanying drawings, A represents a square safe, though it may be of any convenient shape, constructed preferably of three plates of metal, the outer and inner plates, *a a'*, being of iron, and the central plate, *b*, being of steel, these plates *a a' b* being thus arranged that they may offer the most effective resistance to burglars and to rocks upon which the safe may be thrown by waves. The thickness of the walls or plates *a a' b* of the safe A will bear certain relative proportions to its bulk and to the weight intended to be carried in the safe and when an outside auxiliary buoyant and protecting jacket is desired, to the increased buoyancy thus acquired, so that safe A shall easily float and safely carry a given number of pounds, which shall have been previously ascertained by actual experiment with each safe and marked thereon. The safe A will stand on rollers, by means of which it may be more easily moved, and will be coated with paint to prevent corrosion.

B B are the fastenings for holding the jacket C (when jacketed safe is desired) upon safe A. Said fastenings B consist of small projecting metal rods *c c*, held in place by straps *c'* at their bases, that are riveted on the outer plates, *a*, of the walls of the safe A where needed.

Instead of the straps *c'*, the metal rods *c c* may be securely wedged at their bases in small slots or grooves cut in the outer plates, *a*, of the safe A, and after the rods are in place in the slots the latter may be filled with solder to better secure the rods *c c*. In case the said outer plates, *a*, of the walls of the safe A are normally too thin to admit of cutting the slots without penetrating through said outer plates, then the said outer plates will be made with raised places in which to cut said slots. Said rods *c c* project at right angles from the safe A, and their free ends are preferably screw-threaded.

C represents the auxiliary buoyant and protecting jacket inclosing the safe A, which is put on in sections, and held in place by the rods *c c*, that pass through said jacket C and through metal straps or bands *d*, laid on the outside of said jacket C, and have nuts *f* turned on their screw-threaded ends.

Instead of the bands *d*, ordinary washers may be used.

The door C' in the jacket C is hinged, preferably at its lower edge, at *d'*, on the bands *d*, or otherwise, and may be secured, when closed, by straps and staples *f' f'*, through the latter of which spring-keys or padlocks may be passed, or by any convenient device.

In one side of the safe A an opening, *g*, is cut, over and about which, on the inner side of the safe, is fitted the door-plate D, which is laid on rubber *h*, or some other material, to make a water-joint where said door-plate D is fastened upon said safe A, and secured in position by rivets or bolts *i i*, as shown, so as to be both air and water tight. The face of the rim of the door-plate D comes out flush with the inside face of the safe A, and the hinges *k k*, by which the door F is secured in place, are to be secured in suitable notches formed in one face of the opening *g*, or in both the said face and that part of the door-plate which is flush therewith. The opening $l$ through the door-plate D is the only opening into the safe A, and around this opening $l$, on the outer face of the said door-plate D, is a grooved projection, $m$, within the groove of which is laid a piece of heavy rubber, $m'$, for the edge of the flange E on the door F, to strike against when the door F is closed, and said plate D is also provided with projecting screw-sockets or hollow threaded posts $n$ to receive the screws $n'$, that are passed through the holes $n^2$ in the door F, on either side of the lock G, said screws $n'$ being used to draw the said door F up, when closed, so as to cause the flange E on its inner face to press hard against or be embedded in the rubber $m'$ in the grooved projection $m$ on the door-plate D, thereby closing the opening $l$ water and air tight. The holes in the posts $n$ do not extend entirely through them, nor do the posts $n$ extend outward to a level with the grooved projection $m$ on the door-plate D, lest the posts $n$ would interfere with the tight closing of the opening $l$ by the contact of the flange E with the said rubber $m'$ in the grooved projection $m$ when the door F is drawn up by the screws $n'$.

The door-plate D, it will be seen, is recessed; or it may be made concave at one side and put on with its recessed side facing outward, to make room for the combination-lock G, at $o$, when the door F is closed, and for the purpose of making the said plate D lighter, and, in combination with the door F, water-tight, and to give room for the bolts of the said combination-lock G to slide in under the edges of the safe-walls where desired, and a recess is made for the bent projection $o'$ to slide under the wall of the safe, between the hinges $k$ $k$, when the door F is closed. The recess in door-plate D is made enough larger than the opening $g$ and notches around which it is fitted to give sufficient room for the said projection $o'$ and the bolts to catch under the said walls of the said safe A, as above described.

It will also be seen that the opening $l$ through the door-plate D is placed to one side of the center of the plate D. This is to make room for the lock G and its bolts when the door F is closed, and room on the other side of the said opening $l$ for the said parts of hinges $k$ $k$ and the said projection $o'$. The door F has attached to it the other parts of the hinges $k$ $k$ and their bolts $k'$, by means of which said door F is secured to the door-plate D. A hooked or bent projecting finger, $o'$, made on the rear or hinged edge of the door F, is designed to catch under the wall of the safe A, as shown in Fig. 7, when the said door F is closed, to take the strain off the hinges $k$ $k$ when the door F is being screwed tight, and to hold said door F in place should either or both of the hinges $k$ $k$ become broken. Upon the inner face of the door F is also the flange E, which, when the door F is closed, fits and is embedded in the said rubber $m'$ in the grooved projection $m$ on the door-plate D, to make the safe A air and water tight at $l$. The said flange E is placed to one side of the middle of the door F to make room for the combination-lock G to be put on the said door F, on the inner side or face thereof. The handles on the outer face of the door F by which the bolts and lock G are manipulated and the said door opened and closed, are represented at $q$ $q'$.

H represents the binder, the object of which is to hold the contents of the safe A immovable. Said binder H consists of four or more light arms, $s$, radiating from a central hub, $s'$, to the four corners of the safe A, and connected by light wires $s^2$ at suitable distances apart, to make contact with and bind down the contents of said safe A, the said contents being represented at $s^3$. A screw-threaded iron rod, $r$, is fixed centrally in the safe A, between the top and bottom thereof, and on this rod $r$ is fixed the binder H, so as to move freely up and down, and above the said binder a nut, $r'$, is placed on said rod $r$, whereby said binder H is held down upon the contents $s^3$ of the said safe A. In the groove $t$, which extends the whole length of the rod $r$, are several notches, $t'$, that are designed to receive the end of the spring catch or stop $t^2$, that is pivoted on the said hub $s'$, so as to run up and down in said groove $t$. There is also on the said hub $s'$ a little tongue, which projects into the said groove $t$ to keep the said binder H from turning to one side or the other. When the contents $s^3$ are in place the stop $t^2$ is raised by the operator with the finger and the binder H lowered down on said contents $s^3$, and then the nut $r'$ is turned down hard on said binder H, and said contents are thereby held securely in place. When the nut is turned up the binder H may be raised, and the stop or catch $t^2$ will fall into one of the notches $t'$ and hold said binder H at the desired elevation for removing any of the contents of said safe A. A cord and pulley may be arranged within the safe A for raising the binder H.

I represents the false safe into which it is designed to place the safe A on board the vessel. It is made of iron or steel, or of the two combined, and built into or otherwise firmly secured to the vessel. The false safe I is a little larger than the safe A, and is open at the top, so that said safe A may float out when the vessel sinks. It may be four sided, or have fewer sides, according to its location on board the vessel. One of the sides of the false safe I nearest to the side of the vessel M is hinged and locked, so as to be readily opened and the safe A rolled out and overboard in case the vessel is about to be destroyed by fire. This hinged side of the false safe I is not necessarily water-tight. On the inside face of the walls of the false safe I are to be fastened at suitable points rubber pads or buttons, projecting toward or to the exterior of the safe A, to break the concussion which otherwise would be produced by said safe A shifting in the extra (floating) space of the false safe I when the vessel M rolls or plunges heavily. These projections are not, however, to be so hard at their tips or close to the exterior of the safe A as to in the least bind said safe A when floating out of said false safe I.

Instead of the pads or buttons, rollers may be fastened at suitable points on the inner face of the walls of said false safe I, projecting to the exterior of said safe A, but not hard, so as to bind it on floating out, said rollers being set so they shall roll upward when said safe A floats out of said false safe I. By using rollers, as just described, it would be impossible for said safe A to move in any direction except upward, when, if the rollers are nicely adjusted, they would aid the safe A to go out. The rollers are therefore preferred to the pads or buttons.

In order that the safe A may float free of the vessel in case the latter sinks, said safe A should be placed on deck similarly as shown in Fig. 1, wherein M represents a vessel, and at the same time said safe A must be so secured that it cannot be washed overboard. The false safe I provides for these contingencies, and also makes the safe A more burglar and fire proof. In case of the loss of the vessel by fire, and if, from neglect or other cause, the safe A were not rolled overboard, it will be readily seen that the false safe I, which admits of a large and free circulation of air about the safe A and protects it, except on top, from the flames, would greatly, if not entirely, preserve its contents from injury, and in consequence of the buoyancy of the safe, if it were not jacketed, it would be still better preserved, since, should the hull of the vessel sink, the safe A might still float. The safe A would ordinarily be in charge of the purser on board of the vessel. Hence the false safe I might form a part of the partition or bulk-head of his room, so that he could have access to it from his room. Thus located, the partition side of the false safe I would have a water-tight door in it over the door F of the safe A, as shown at I′. The door I′ is made water-tight to keep the water which may fly over the top and into the false safe I from wetting the room. The door I′ may be on hinges, and made of either metal or wood, and optionally locked.

The top of the safe A and false safe I may be covered with canvas firmly secured on one side, but temporarily secured on the others, or otherwise arranged so as to shelter said safe A, false safe I, and buoy L from sun and storms, and yet slide off, and not encumber or impede said safe A when floating out of said false safe I. Centrally on the top of said safe A is a screw-threaded socket, K, and into this socket is screwed the lower end of the staff of the sheet-metal buoy L, that extends above the said safe A and its jacket C, and is painted with bright colors, designed to attract attention to the safe A when the latter is in the water. Said buoy L will also increase the buoyancy of the safe A when the same is sufficiently low in the water.

Constructed and arranged substantially as herein shown and described, a safe will be cheap as to cost compared to other burglar and fire proof safes, be simple in construction and operation, and convenient, be water-proof and buoyant, be burglar-proof while on board ship, be fire-proof, free itself and float from a sinking ship without assistance, keep afloat for an indefinite time until washed ashore or picked up, preserve its contents from loss by sinking or injury by water, endure being thrown upon a rocky coast without breaking, and be the means of restoring its contents to the lawful owners or their legal representatives or the world, which contents otherwise would have been, like the vessel, a total loss.

Having thus fully described my invention, what I claim as new, and desire to secure by Letters Patent, is—

1. The combination of the body of the safe A, having an opening, *g*, cut in one of its sides, with the door F, hinged on the door-plate D, and fitting said opening, and the apertured door-plate D, secured to the inner surface of the safe over and about said opening, and having a recess, *o*, whereby the door, on being closed, shall meet with no resistance except the contact of the flange E with the rubber *m′*, and whereby space shall be provided for accommodating the locks, bolts, grooved projection *m*, screw-sockets *n*, and parts of hinges *k k*, substantially as shown and described.

2. In combination with the body of a safe, the door-plate D, having recess *o*, with aperture *l* in said recess, to one side of its center, for ingress to the safe, a grooved projection, *m*, surrounding said aperture, and provided with rubber *m′* and projecting screw-sockets *n*, and the door F, having screws *n′*, substantially as shown and described.

3. The combination of the body of the safe A and the door-plate D, having grooved projection *m* and rubber *m′*, with the door F, having flange E, which is adapted to fit against the said rubber, and a bent projection, *o′*, adapted to engage with the inner surface of the safe when the door is closed, substantially as shown and described, and for the purpose set forth.

4. The combination of the safe A with the grooved and notched rod *r*, the binder H, nut *r′*, and the stop $t^2$, substantially as shown and described.

5. The combination of the safe A and the rod *r*, having groove *t* and notches *t′*, with the binder H, having arms *s*, hub *s′*, and wires $s^2$, and the stop $t^2$, substantially as shown and described.

6. The combination of the safe A, provided with straps *c′*, secured to its outer surface, and rods *c*, held at right angles to the safe by the said straps, with the buoyant jacket C, having bands *d* on its outer surface and perforations for receiving the said rods, and nuts *f* for holding the rods in position, substantially as shown and described.

7. The combination of the safe A, having screw-threaded socket K on top, buoyant jacket C, secured to the outer surface of the safe, and the sheet-metal buoy L, having its staff screwed into said socket, substantially as shown and described.

8. The combination of the safe A, constructed of metal plates *a a′ b*, and the buoyant jacket C, secured thereto in sections, with the false safe I, having rollers secured to its inner surface to facilitate the egress of the safe from the said false safe, substantially as shown and described.

9. The safe A, constructed of metal plates *a a′ b*, with opening *g*, in combination with the rubber *h*, the recessed door-plate D, secured to the inner surface of the safe against the rubber *h*, and having projecting screw-sockets *n*, and the door F, having screws *n′*, substantially as shown and described.

10. The combination of the safe A, the rod *r*, and the binder H, having arms *s*, radiating from a central hub and connected by wires $s^2$, substantially as shown and described, and for the purpose set forth.

DAVID W. SMITH.

Witnesses:
JAMES SEAVEY,
C. L. TERRY.